(12) United States Patent
Wallace et al.

(10) Patent No.: US 6,303,089 B1
(45) Date of Patent: Oct. 16, 2001

(54) RECLAIMING OF PURGE GAS FROM HYDROTREATERS AND HYDROCRACKERS

(75) Inventors: Paul S. Wallace, Katy; Kay Anderson Johnson, Missouri City, both of TX (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/480,395

(22) Filed: Jan. 11, 2000

Related U.S. Application Data

(60) Provisional application No. 60/115,391, filed on Jan. 11, 1999.

(51) Int. Cl.⁷ .............................. C01B 3/26; C10G 45/00
(52) U.S. Cl. .......................... 423/248; 423/652; 208/100
(58) Field of Search ................... 423/248, 648.1, 423/652, 226, 227, 228, 229; 208/100

(56) References Cited

U.S. PATENT DOCUMENTS

| | | | |
|---|---|---|---|
| 4,099,382 | 7/1978 | Paull et al. | 60/648 |
| 4,178,758 | 12/1979 | Paull et al. | 60/648 |
| 4,272,357 | 6/1981 | Rollmann | 208/89 |
| 4,273,644 | 6/1981 | Harris et al. | 208/321 |
| 4,476,094 | 10/1984 | Carson | 422/62 |
| 5,082,551 | * 1/1992 | Reynolds et al. | 208/100 |
| 5,292,428 | 3/1994 | Harrison et al. | 208/208 R |
| 5,362,382 | 11/1994 | Heck et al. | 208/210 |
| 5,376,258 | 12/1994 | Sakoda | 208/57 |
| 5,382,349 | 1/1995 | Yoshita et al. | 208/210 |
| 5,472,986 | 12/1995 | van Dijk | 518/705 |
| 5,474,977 | 12/1995 | Gatsis | 502/172 |
| 5,624,844 | 4/1997 | Xu et al. | 435/264 |
| 6,090,356 | * 7/2000 | Janhke et al. | 423/210 |
| 6,096,195 | * 8/2000 | Steicher et al. | 208/254 R |

FOREIGN PATENT DOCUMENTS

| | | | |
|---|---|---|---|
| 2 767 529 | 2/1999 | (FR) . | |
| 624 447A | 6/1949 | (GB) | 45/2 |

* cited by examiner

*Primary Examiner*—Steven P. Griffin
*Assistant Examiner*—Manbel Medina
(74) *Attorney, Agent, or Firm*—Morris N. Reinisch; Howrey Simon Arnold & White

(57) ABSTRACT

The invention is a process to recover a high pressure hydrogen-rich gas stream from a purge gas stream taken from a hydrotreater. This purge gas stream is admixed with synthesis gas that was the original source of the hydrogen to form a gaseous mixture. This mixed gas comprising purge gas and synthesis gas is advantageously treated to remove acid gases and possibly other impurities. The mixed gas is then treated to extract a hydrogen-rich gas and a hydrogen-depleted gas using, for example, a membrane. At least a portion of the hydrogen-rich gas is then heated and compressed as necessary and is recycled to the hydrotreater.

16 Claims, No Drawings

RECLAIMING OF PURGE GAS FROM HYDROTREATERS AND HYDROCRACKERS

Priority of U.S. Provisional Application No. 60/115,391, filed Jan. 11, 1999 is claimed.

BACKGROUND OF THE INVENTION

The production of synthesis gas from the solid and liquid carbonaceous fuels, especially coal, coke, and liquid hydrocarbon feeds, has been utilized for a considerable period of time and has recently undergone significant improvements due to the increased energy demand and the need for clean utilization of otherwise low value carbonaceous material. Synthesis gas may be produced by heating carbonaceous fuels with reactive gases, such as air or oxygen, often in the presence of steam and or water in a gasification reactor to obtain the synthesis gas which is withdrawn from the gasification reactor.

The gasification and subsequent combustion of certain carbonaceous materials provides an environmentally friendly method of generating fuel for power and needed chemicals from these otherwise environmentally unfriendly feedstocks. Coal, petroleum based feedstocks including petroleum coke and other carbonaceous materials, waste hydrocarbons, residual oils and byproducts from heavy crude oil are commonly used for gasification reactions.

Synthesis gas mixtures comprise carbon monoxide and hydrogen. Hydrogen is a commercially important reactant for hydrogenation reactions. The synthesis gas can also be used to generate power from otherwise environmentally unacceptable fuel sources, and as a source of feed gas for the synthesis of hydrocarbons, oxygen-containing organic compounds or ammonia.

Other materials often found in the synthesis gas include hydrogen sulfide, carbon dioxide, ammonia, hydrocarbons, cyanides, and particulates in the form of carbon and trace metals. The extent of the contaminants in the feed is determined by the type of feed and the particular gasification process utilized as well as the operating conditions. In any event, the removal of these contaminants is critical to make gasification a viable process.

As the product gas is discharged from the gasifier, it is usually subjected to a cooling and cleaning operation involving a scrubbing technique wherein the gas is introduced into a scrubber and contacted with a water spray which cools the gas and removes particulates and ionic constituents from the synthesis gas. The initially cooled gas may then be treated to desulfurize the gas prior to utilization of the synthesis gas.

When the product desired is hydrogen, the synthesis gas from the gasifier is shifted using catalyst to form hydrogen as shown below.

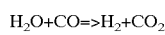

The shift process, also called a water gas shift process or steam reforming, converts water and carbon monoxide to hydrogen and carbon dioxide. The shift process is described in, for example, U.S. Pat. No. 5,472,986, the disclosure of which is incorporated herein by reference.

The hydrogen gas is often used in subsequent processes, particularly hydrotreating. For many applications, especially for hydrotreating hydrocarbons, the hydrogen is required at higher purity and at pressures of between about 1000 psi (6895 kPa) and about 3000 psi (20,684 kPa). The shifted synthesis gas must therefore be purified to meet product specifications.

The synthesis gas is processed to provide a hydrogen rich gas stream and a carbon monoxide/carbon dioxide rich gas stream. Other impurities in the gas generally follow the carbon monoxide/carbon dioxide rich gas stream. One method of purifying gas is via the pressure swing absorption process. This method is expensive and requires significant capital outlay.

A membrane system can also be used to affect the separation. A membrane allows small molecules like hydrogen to pass through (permeate) while the larger molecules ($CO_2$, $CO$) do not permeate. Membranes are a cost effective alternative to a pressure swing absorption unit. The membranes reduce the pressure of the product hydrogen so it has to be compressed prior to use. For example, the product hydrogen pressure when purified using a membrane is substantially lower than is required by hydrotreaters.

SUMMARY OF THE INVENTION

The invention is a process to recover hydrogen from a purge gas stream taken from a hydrotreater. Hydrotreater gas and a liquid hydrocarbon stream react in the hydrotreater. Hydrotreater effluent gas is split, with a fraction being mixed with hydrogen to form hydrotreater gas, which is subsequently introduced to the hydrotreater. A purge gas stream comprising hydrotreater effluent gas is admixed with synthesis gas. This mixed gas comprising purge gas and synthesis gas is advantageously treated to remove acid gases and possibly other impurities. The mixed gas is then treated to extract a hydrogen gas stream and a remaining carbon monoxide/hydrogen gas stream using, for example, a membrane. The hydrogen gas stream is recycled to the hydrotreater.

DETAILED DESCRIPTION OF THE INVENTION

The invention involves the integration of oil refining and gasification, and more particularly the integration of solvent deasphalting, gasification, and hydrotreating. More particularly, the invention is a process to recover hydrogen from a purge gas stream taken from a hydrotreater, where gasification and the accompanying gas treatment facilities are available.

The process to recover hydrogen from a hydrotreater effluent gas purge comprises removing the hydrotreater effluent gas from the hydrotreater and separating a portion designated as purge gas with the remainder designated recycle hydrotreater effluent gas. The purge gas stream is then admixed with a synthesis gas stream, thereby creating a mixed gas stream. The gasification plant that produces synthesis gas has facilities for acid gas removal and facilities to produce separate hydrogen and fuel gas streams. The mixed gas undergoes this process, and the hydrogen is admixed with the recycle hydrotreater effluent gas to form hydrotreater gas. This hydrotreater gas is subsequently introduced to the hydrotreater.

In one embodiment of the invention, a deasphalted oil is separated from a heavy crude through solvent extraction. The bottoms from the extraction, the asphaltenes, are low value hydrocarbonaceous material. Such material may be advantageously gasified to generate hydrogen, power, steam, and synthesis gas for chemical production. Such a process advantageously has gas treatment facilities which can be advantageously used in the process of this invention. The deasphalted oil can be processed into a source of high-value diesel oil in a fluidized catalytic cracking unit. The deasphalted oil generally contains significant quantities of sulfur- and nitrogen-containing compounds. This deasphalted oil may also contain long chain hydrocarbons. To meet environmental regulations and product specifications, as well as to extend the life of the catalyst, the fluidized catalytic cracking unit feed is hydrotreated first to remove sulfur components. This invention is a process to treat and recover a portion of the purge gas from this hydrotreating process.

As used herein, the terms "hydrotreating", "hydrocracking", and "hydrogenation" are used interchangeably to mean reacting a hydrogen gas with a hydrocarbon mixture, wherein the hydrocarbon mixture usually contains sulfur and other undesirable components.

During hydrotreating, hydrogen is contacted with a hydrocarbon mixture, optionally in the presence of a catalyst. The catalyst facilitates the breaking of carbon-carbon, carbon-sulfur, carbon-nitrogen, and carbon-oxygen bonds and the bonding with hydrogen. The purpose of hydrotreating is to increase the value of the hydrocarbon stream by removing sulfur, reducing acidity, and creating shorter hydrocarbon molecules.

As used herein, the term "hydrogen" means a gas comprising greater than about 80 mole percent, preferably greater than about 90 mole percent, of molecular hydrogen gas.

The pressure, temperature, flowrates, and catalysts required to complete the hydrogenation reactions are known to the art. Typical conditions of the thermal hydrocracking are as follows: the reaction temperature of about 300° C. to about 480° C.; the partial pressure of hydrogen of about 30 kg per square centimeter to about 200 kg per square centimeter; the liquid space velocity of about 0.1 per hour to 2.0 per hour. Catalysts may be advantageously added, often at about 0.01 to 0.30 weight per weight of fluid.

Hydrotreating is most effective when the hydrocarbon mixture is contacted with relatively pure hydrogen. Hydrotreating requires a hydrogen-rich gas comprising greater than about 80 mole percent, of hydrogen gas. The hydrotreating creates volatile hydrocarbons, volatile sulfur- and nitrogen-containing hydrocarbons, hydrogen sulfide, and other gaseous contaminants. Nevertheless, the gas leaving the hydrotreater is predominantly hydrogen. This gas is advantageously recycled to the hydrotreater.

An excess amount of hydrogen is present during the reaction. During the hydrotreating process, hydrogen sulfide and short chain hydrocarbons such as methane, ethane, propane, butane and pentane are formed. When the gas stream leaves the reactor, it is still primarily hydrogen. The gas stream also contains vaporized hydrocarbons, gaseous hydrocarbons such as methane and ethane, hydrogen sulfide, and other contaminants. This gas stream is treated to remove condensables and is then recycled to the hydrotreating reactor. Removing condensables requires cooling the hydrotreater effluent gas to between about 0° C. and about 100° C., preferably to between about 0° C. and about 30° C. However, non-condensable by-products of the hydrotreatment reaction build up, and a purge stream must be taken off the recycled gas stream to keep the impurities from building up to concentrations that would inhibit the hydrotreating reaction.

This purge gas stream is admixed with synthesis gas that was the original source of the hydrogen.

As used herein, the term "synthesis gas" refers to gases comprising both hydrogen gas and carbon monoxide gas in amounts in excess of about 5 mole percent each. The mole ratio of hydrogen to carbon monoxide may, but need not necessarily, be about one to one. There is often some inerts in the synthesis gas, particularly nitrogen and carbon dioxide. There are often contaminants, such as hydrogen sulfide and COS. The synthesis gas is prepared by partially burning a hydrocarbonaceous fuel and oxygen in a reactor, often in the presence of steam and/or water, in proportions producing a mixture containing carbon monoxide and hydrogen in the reactor.

The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". Solid, gaseous, and liquid feeds may be mixed and used simultaneously; and these may include paraffinic, olefinic, acetylenic, naphthenic, asphaltic, and aromatic compounds in any proportion.

The hydrocarbonaceous fuels are reacted with a reactive oxygen-containing gas, such as air, or substantially pure oxygen having greater than about 90 mole percent oxygen, or oxygen enriched air having greater than about 21 mole percent oxygen. Substantially pure oxygen is preferred. The partial oxidation of the hydrocarbonaceous material is completed, optionally in the presence of a temperature control moderator such as steam, in a gasification zone to obtain the hot partial oxidation synthesis gas.

Synthesis gas can be manufactured by any partial oxidation method. Preferably, the gasification process utilizes substantially pure oxygen with above about 95 mole percent oxygen. The gasification processes are known to the art. See, for example, U.S. Pat. No. 4,099,382 and U.S. Pat. No. 4,178,758, the disclosures of which are incorporated herein by reference.

In the gasification reactor, the hydrocarbonaceous fuel is contacted with a free-oxygen containing gas, optionally in the presence of a temperature moderator. In the reaction zone, the contents will commonly reach temperatures in the range of about 900° C. to 1700° C., and more typically in the range of about 1100° C. to about 1500° C. Pressure will typically be in the range of about 1 atmospheres (101.325 kPa) to about 250 atmospheres (25,331 kPa), and more typically in the range of about 15 atmospheres (1519 kPa) to about 150 atmospheres (15,190 kPa), and even more typically in the range of about 800 psi (5516 kPa) to about 2000 psi (13,789 kPa).

The synthesis gas is cooled and washed of contaminants, preferably with energy recovery such as by steam raising and/or steam superheating. There may follow lower grade heat recoveries, as in conventional synthesis gas manufacturing. The purge gas is typically, but not necessarily, admixed with the synthesis gas after some heat has been extracted from the synthesis gas. There may be other conventional gas treatment steps such as steam removal and, where appropriate, of composition adjustment.

If hydrogen gas is a desired product, it is advantageous to subject the synthesis gas, or the mixed gas, to steam reforming to increase the relative yield of hydrogen gas. Steam reforming is a process of adding water, or using water contained in the gas, and reacting the resulting gas mixture adiabatically over a steam reforming catalyst. The primary purpose of steam reforming is to increase the amount of hydrogen in the gas mixture. The synthesis gas contains hydrogen sulfide ($H_2S$) and COS formed from sulfur in the feed to the gasifier. The COS is shifted in the steam reformer following the same reaction path as carbon monoxide to form hydrogen sulfide and carbon dioxide.

The synthesis gas composition of a gasification reaction is typically hydrogen gas at 25 to 45 mole percent, carbon monoxide gas at 40 to 50 mole percent, carbon dioxide gas at 10 to 35 mole percent, and trace contaminants. In a steam reformed synthesis gas a typical composition is hydrogen gas at 35 to 65 mole percent, carbon monoxide gas at 0.3 to 10 mole percent, carbon dioxide gas at 30 to 60 mole percent, and trace contaminants. These ranges are not absolute, but rather change with the fuel gasified as well as with gasification parameters.

The steam reforming catalyst is one or more Group VIII metals on a heat resistant support. Conventional random packed ceramic supported catalyst pieces, as used for example in secondary reformers, can be used but, since these apply a significant pressure drop to the gas, it is often advantageous to use a monolithic catalyst having through-passages generally parallel to the direction of reactants flow.

The gas temperature during steam reforming typically is in the range 750° F.(398° C.) to 1050° F. (565° C.). This process may take place before heat is recovered from the synthesis gas.

The acid gas removal facilities for the synthesis gas, with its amine or physical solvents, removes the acid gases, particularly hydrogen sulfide, from the mixed synthesis gas/purge gas stream. The acid gas removal facilities typically operate at lower temperatures. After the synthesis gas is cooled to below about 130° C., preferably below about 90° C., the contaminants in the gas, especially sulfur compounds and acid gases, can be readily removed.

The hydrogen sulfide, an acid gas, is easily removed from the synthesis gas. The type of fluid that reacts with the acid gas is not important. Conventional amine solvents, such as MDEA, can be used to remove the hydrogen sulfide. Physical solvents such as SELEXOL™ and RECTIXOL™ can also be used. The fluids may be solvents such as lower monohydric alcohols, such as methanol, or polyhydric alcohols such as ethylene glycol and the like. The fluid may contain an amine such as diethanolamine, methanol, N-methyl-pyrrolidone, or a dimethyl ether of polyethylene glycol. The physical solvents are typically used because they operate better at high pressure. The synthesis gas is contacted with the solvent in an acid gas removal contactor. Said contactor may be of any type known to the art, including trays or a packed column. Operation of such an acid removal contactor is known in the art.

It is preferred that the design and operation of the acid gas removal unit result in a minimum of pressure drop. The pressure of the synthesis gas is therefore preserved.

It is advantageous to add the purge stream to the synthesis gas prior to running the synthesis gas through the acid gas removal unit. The advantages include, but are not limited to, the economics of having one unit operation for removal of contaminant gases, especially acid gases such as hydrogen sulfide, and the enrichment of the synthesis gas in hydrogen concentration. In a preferred embodiment of this invention at least a portion of the purge gas from the hydrotreater is routed through the synthesis gas acid gas removal unit, and then through a separation unit such as a membrane, to remove contaminants and to increase the hydrogen concentration in the recycled hydrogen-rich purge gas.

The pressure of the commingled purge gas/synthesis gas stream is about 500 psi (3447 kPa) to about 2000 psi (13789 kPa), typically between about 800 (5516 kPa) and 1200 psi (8274 kPa). The temperature of the commingled gas is extremely variable.

The mixed purge gas/synthesis gas enters gas separation unit, such as a membrane designed to allow hydrogen molecules to pass through but to block larger molecules such as carbon monoxide. The membrane can be of any type which is preferential for permeation of hydrogen gas over carbon dioxide and carbon monoxide. Many types of membrane materials are known in the art which are highly preferential for diffusion of hydrogen compared to nitrogen. Such membrane materials include those composed of silicon rubber, butyl rubber, polycarbonate, poly(phenylene oxide), nylon 6,6, polystyrenes, polysulfones, polyamides, polyimides, polyethers, polyarylene oxides, polyurethanes, polyesters, and the like. The membrane units may be of any conventional construction, and a hollow fiber type construction is preferred.

A hydrogen rich gas permeate gas through the membrane. The permeate experiences a substantial pressure drop of between about 500 psi (3447 kPa) and 700 psi (4826 kPa) as it passes through the membrane. This hydrogen rich gas is then heated and compressed as necessary and at least a portion is recycled to the hydrotreater.

The hydrogen-rich gas advantageously comprises greater than about 80 mole percent, more preferably greater than about 90 mole percent, hydrogen gas.

The non-permeate gas stream from the membrane contains carbon dioxide, carbon monoxide, and some hydrogen. Other compounds, in particular volatile hydrocarbons, may also be present. This non-permeate makes a good fuel for combustion turbines. The non-permeate's pressure is virtually unaffected by the membrane. The pressure of this permeate is advantageously reduced prior to burning in a combustion turbine.

In one important embodiment of this invention, purge gas from a subsequent hydrotreating process is combined with the synthesis gas prior to contacting the gas mixture with amine solvents or physical solvents, but after steam reforming.

In another embodiment of this invention the gas streams are admixed prior to treatment in the steam reforming unit. The COS can be shifted to hydrogen sulfide and carbon monoxide. And the carbon monoxide can, of course, be converted to hydrogen and carbon dioxide. This is not necessary to the invention—the hydrocarbons and carbon monoxide can also be advantageously used in the non-permeate as fuel.

The hydrogen is mixed with recycled hydrogen from the hydrotreater that has been compressed to the appropriate pressure.

Hydrogen sulfide from the acid gas removal unit is routed to an acid gas stream which is sent to a sulfur recovery process.

In view of the above disclosure, one of ordinary skill in the art should understand and appreciate that at least one embodiment of the present invention includes a process to recover a hydrogen from a hydrotreater effluent gas purge. Such an embodiment of the present inventive process includes:

a) reacting a hydrocarbon stream and hydrotreater gas in a hydrotreater, thereby forming a hydrotreater effluent gas and a liquid product;

b) removing the hydrotreater effluent gas;

c) separating a portion of the hydrotreater effluent gas, thereby creating a recycle hydrotreater effluent gas stream and a purge gas stream;

d) admixing the hydrotreater effluent gas purge with a synthesis gas stream, thereby creating a mixed gas stream;

e) treating said mixed gas stream to produce separate hydrogen and fuel gas streams; and f) admixing the recycle hydrotreater effluent gas with at least a portion of the hydrogen stream to form hydrotreater gas, wherein said hydrotreater gas is introduced to the hydrotreater. It is preferred that the hydrotreater effluent gas includes of hydrogen gas, hydrogen sulfide, and methane. In one preferred embodiment the cooling the hydrotreater effluent gas to a temperature between about 0° C. and about 100° C. to remove condensables prior to step (c) and more preferably to a temperature between about 0° C. and about 50° C. so as to remove condensables prior to step (c). The process may further in include the removing acid gases from the admixed gas of step (e) prior to separating the mixed gas into hydrogen and fuel gas streams. Typically the acid gases are composed of hydrogen sulfide. It is envisioned that the process of removing acid gases includes contacting the admixed gas with one or more of SELEXOL™, RECTIXOL™, diethanolamine, methanol, N-methyl-pyrrolidone, or a dimethyl ether of polyethylene glycol. The process is preferably carried out with hydrotreater gas which is composed of greater than about 80 mole percent of hydrogen gas. In one preferred embodiment, the synthesis gas is composed of about 25 mole percent to about 45 mole percent hydrogen gas, about 40 mole percent to about 50 mole percent carbon monoxide gas, and about 10 mole percent to about 35 mole percent carbon dioxide gas. The process may preferably include a synthesis gas that is a steam reformed synthesis gas comprising about 35 mole percent to about 65 mole percent hydrogen gas, about 0.2 mole percent to about 10 mole percent carbon monoxide gas, and about 30 mole percent to about 60 mole percent carbon dioxide gas.

In another embodiment of the present invention the process is such that the separating of the mixed gas into hydrogen and fuel gas streams comprises contacting the mixed gas with a membrane designed to allow hydrogen molecules to pass through but to block larger molecules. The membrane is preferably composed of one or more of silicon rubber, butyl rubber, polycarbonate, poly(phenylene oxide), nylon 6,6, polystyrenes, polysulfones, polyamides, polyimides, polyethers, polyarylene oxides, polyurethanes, and polyesters. The process may further include heating and compressing the hydrogen gas before introducing at least a portion of the gas to the hydrotreater. It is preferred that the hydrogen be composed of greater than about 90 mole percent hydrogen gas. The process may further include steam reforming the mixed gas of step (e) prior to separating the mixed gas into hydrogen and fuel gas streams, wherein steam reforming comprises reacting water and the gas mixture over a steam reforming catalyst. It is preferred that the steam reforming catalyst is one or more Group VIII metals on a heat resistant support, and wherein the gas temperature is between about 7500° F. (398° C.) to 1050° F. (565° C.).

While the compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A process to recover a hydrogen from a hydrotreater effluent gas purge, said process comprising;

a) reacting a hydrocarbon stream and hydrotreater gas in a hydrotreater, thereby forming a hydrotreater effluent gas and a liquid product;

b) removing the hydrotreater effluent gas;

c) separating a portion of the hydrotreater effluent gas, thereby creating a recycle hydrotreater effluent gas stream and a purge gas stream;

d) admixing the hydrotreater effluent gas purge with a synthesis gas stream, thereby creating a mixed gas stream;

e) treating said mixed gas stream to produce separate hydrogen and fuel gas streams; and f) admixing the recycle hydrotreater effluent gas with at least a portion of the hydrogen stream to form hydrotreater gas, wherein said hydrotreater gas is introduced to the hydrotreater.

2. The process of claim 1 wherein the hydrotreater effluent gas comprises hydrogen gas, hydrogen sulfide, methane and other light hydrocarbons.

3. The process of claim 1 further comprising cooling the hydrotreater effluent gas to between about 0° C. and about 100° C. to remove condensables prior to step (c).

4. The process of claim 1 further comprising cooling the hydrotreater effluent gas to between about 0° C. and about 50° C. to remove condensables prior to step (c).

5. The process of claim 1 further comprising removing acid gases from the admixed gas of step (e) prior to separating the mixed gas into hydrogen and fuel gas streams.

6. The process of claim 5 wherein the acid gases comprise hydrogen sulfide.

7. The process of claim 5 wherein removing acid gases comprises contacting the admixed gas with one or more of SELEXOL™, RECTIXOL™, diethanolamine, methanol, N-methyl-pyrrolidone, or a dimethyl ether of polyethylene glycol.

8. The process of claim 1 wherein the hydrotreater gas comprises greater than about 80 mole percent of hydrogen gas.

9. The process of claim 1 wherein the synthesis gas comprises about 25 mole percent to about 45 mole percent hydrogen gas, about 40 mole percent to about 50 mole percent carbon monoxide gas, and about 10 mole percent to about 35 mole percent carbon dioxide gas.

10. The process of claim 1 wherein the synthesis gas is a steam reformed synthesis gas comprising about 35 mole percent to about 65 mole percent hydrogen gas, about 10 mole percent to about 20 mole percent carbon monoxide gas, and about 30 mole percent to about 60 mole percent carbon dioxide gas.

11. The process of claim 1 wherein separating the mixed gas of step (e) into hydrogen and fuel gas streams comprises contacting the mixed gas with a membrane designed to allow hydrogen molecules to pass through but to block larger molecules.

12. The process of claim 11 wherein the membrane is comprised of one or more of silicon rubber, butyl rubber, polycarbonate, poly(phenylene oxide), nylon 6,6, polystyrenes, polysulfones, polyamides, polyimides, polyethers, polyarylene oxides, polyurethanes, and polyesters.

13. The process of claim 11 further comprising heating and compressing the hydrogen gas before introducing at least a portion of the gas to the hydrotreater.

14. The process of claim 1 wherein the hydrogen comprises greater than about 90 mole percent hydrogen gas.

15. The process of claim 1 further comprising steam reforming the mixed gas of step (e) prior to separating the mixed gas into hydrogen and fuel gas streams, wherein steam reforming comprises reacting water and the gas mixture over a steam reforming catalyst.

16. The process of claim 15 wherein the steam reforming catalyst is one or more Group VIII metals on a heat resistant support, and wherein the gas temperature is between about 750° C. to about 1050° C.

* * * * *